June 28, 1960 R. CLADE 2,942,840
SPHERICAL PLUG VALVE
Filed May 14, 1956

Robert Clade
INVENTOR.

BY Russell E. Schloff
ATTORNEY

United States Patent Office 2,942,840
Patented June 28, 1960

2,942,840

SPHERICAL PLUG VALVE

Robert Clade, Detroit, Mich., assignor, by mesne assignments, to ACF Industries, Incorporated, a corporation of New Jersey Filed May 14, 1956, Ser. No. 584,859

3 Claims. (Cl. 251—174)

This invention relates to a spherical plug valve.

In some uses, such as when a valve is under high temperature or is in a hazardous location where heat from a fire could damage or burn away the body seat, it is desirable to have a valve provided with a metal seat. A valve having such a seat is disclosed in my copending application S.N. 484,872 filed January 31, 1955, now Patent No. 2,890,856.

The valve of the present invention is provided with a metal seat and additionally has a separate seal ring. It is so constructed that if the seal ring is destroyed there will be a metal to metal seal.

It is an object of the present invention to provide a spherical plug type valve with sealing means capable of retaining a seal under hazardous conditions.

It is another object of the present invention to provide a spherical plug type valve having resilient metal seat members capable of forming a metal to metal seal in case of destruction of the primary seal member.

It is a further object of the present invention to provide a spherical plug type valve having seal members formed from initially flat resilient metal rings.

The invention possesses many other advantages and objects relating to details and economies of manufacture and use and other objects will be made more clearly apparent from a consideration of several forms in which it may be embodied. Such forms are shown in the drawings accompanying and forming part of the present specification. These forms will now be described in detail, illustrating the general principles of the invention, but it is to be understood that such detailed description is not to be taken in a limiting sense, since the scope of the invention is best defined by the appended claims.

Referring to the drawings.

Figure 1:
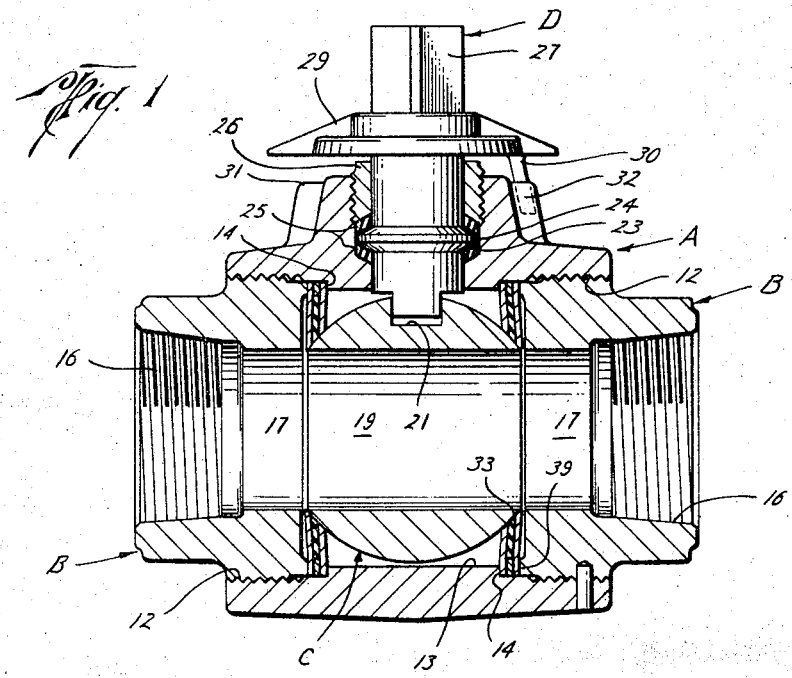
Fig. 1 is a longitudinal cross section view of the valve of the present invention.
Figure 2:
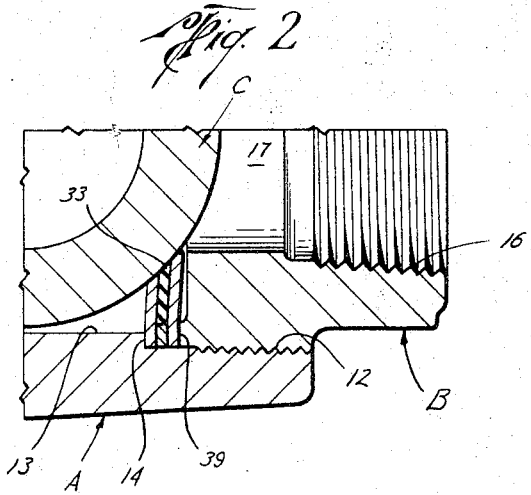
Fig. 2 is an enlarged fragmentary portion of Fig. 1 to illustrate the deflection of the seal member.

Referring now to Fig. 1, the valve is comprised generally of a valve body A, a pair of closure fittings B, B, a spherical plug C and stem D.

The valve body A is provided with a longitudinal bore. The ends 12, 12 of the bore are of a slightly larger diameter than the central portion 13, and the juncture of the ends with the central portion form shoulders 14, 14. Each outer portion is provided with threads to receive a fitting B which is axially movable towards the center of the body. If desired, the threaded connection between the body and fitting may be eliminated and the end of the fitting telescoped into the end of the body and then detachably secured to the body. The outer end 16 of each fitting is provided with a female thread adapted to mate with a male connection; however, the end of the fitting may be provided with any other type of end construction as is well known in the valve art. Since the fittings are detachably secured to the body, fittings having various types of end construction can be used with the same body casting, and the valve assembled to order. Each fitting B is provided with a flow passage 17 which is in axial alignment with the bore.

The spherical plug C is located in the central portion of the bore and is the valving member of the valve. The plug C has a passage 19 registerable with the passages 17, 17 of the fittings to permit flow in the open position. In order to receive stem D, the plug has a transverse key way slot 21 which is milled across the top of the plug C. The slot 21 receives the end 22 of the stem 20. The stem D projects upwardly out of the valve body through a counterbore 23 in a boss on the top of the body. The stem D is provided with a shoulder 24 having tapered bearing surfaces, and packing rings 25, 25 are placed on each side of the shoulder 24. The stem assembly is secured in position by a gland nut 26, which is threadingly engaged in the outer end of the bore 23. The gland nut 26, compresses the packing rings 25, 25 between itself, the tapered surfaces of the shoulder 24 and the bottom of the counter bore 23 thereby preventing leakage. The outer end 27 of the stem 20 may be provided with flats to receive a wrench for turning the stem. A stop ring 29 may be secured to the outer end of the stem, the stop ring 29 being provided with a projection 30 which contacts projections 31, 32 formed on the valve body A to limit the movement of the plug C.

Figure 3:
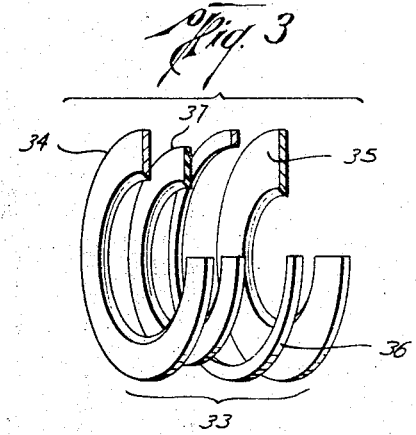
Fig. 3 is an exploded view of the sealing members.

The sealing means 33 for the valve is comprised of two flat resilient metal rings 34 and 35, spacer ring 36 and a gasket 37 as can best be seen in Fig. 3. Each set of the sealing means 33 is clamped as a unit between one of the shoulders 14 and an inner end 39 of one of the fittings B. The two sets of sealing means cooperate to hold the spherical plug C centered in the valve body.

The inner circumferential face of each ring 34, 35 and gasket 37 is formed into a spherical surface to correspond to the face of the spherical plug which is contacted. The gasket 37 may be formed from polytetrafluorethylene, known in the trade under the trademark "Teflon," or other suitable gasket material and is so designed that its inside diameter is slightly smaller than the contacting diameter of the spherical plug which it contacts; therefore, upon assembly, the gasket 37 will be stretched resulting in hoop tension with the spherical plug. The expansion of the gasket increases the thickness of it, and this in turn deflects the metal rings which are on each side of the gasket. The metal rings are therefore always urging the gasket to return to its original thickness, therefore further forcing it against the face of the plug thereby increasing its sealing characteristics.

The valve is so designed that both sets of sealing members are slightly deflected upon assembly. The downstream set of sealing members are subject to further deflection by line pressure, but inasmuch as the upstream set was already under pressure it will retain a seal even though it is returned to a straight position. Also, further line pressure will act upon the upstream set of sealing means as well as on the spherical ball and will tend to keep the sealing means in tight contact with the spherical ball, thereby increasing its sealing characteristics. While the gasket 37 acts as a seal for the valve, if the gasket is destroyed, the ring 34, 35 will provide a metal to metal seal. Therefore, while under ordinary circumstances, a better seal can be provided by utilizing a gasket, nevertheless, a metal to metal seal will remain even though the gasket is destroyed.

What is claimed is:

1. A spherical plug valve having a housing provided with a bore therethrough, the central portion of said bore being of a lesser diameter than the outer portions, the junctures of the central portion and the outer portion of said bore forming shoulders, a pair of fittings, each fitting having an opening therein axially aligned with the bore, each fitting being movable into the outer portion of said bore and detachably secured to the housing, a spherical plug rotatably mounted in the central portion of said bore, said plug having a passage therethrough adapted to be brought into and out of registry with the openings in said fittings, seat members, one seat member positioned in each outer portion of said bore adjacent the central portion and being clamped between the shoulder and its respective fitting to co-operatively hold the spherical plug member centered in the bore, each seat member being formed of a pair of spaced, initially flat, resilient, metal seat rings, the spherical plug being engaged by the inner circumferential surface of said seat rings, a metal spacer ring separating the said rings, the inner diameter of said spacer ring being much greater than the inner diameter of the seat rings, and a deformable seal ring interposed between the seat rings and inside the spacer ring in sealing contact with the spherical plug.

2. The structure of claim 1 characterized in that the seal ring has a smaller inner diameter than the portion of the spherical plug with which it mates whereby upon assembly the seal ring is increased in thickness thereby deflecting the adjacent metal seat rings and putting them under tension which constanly urges the seal ring into sealing contact with the spherical plug.

3. The structure of claim 1 characterized in that the seat members and seal rings are deflected outwardly of the plug upon assembly of the valve.

References Cited in the file of this patent

UNITED STATES PATENTS

| | | |
|---|---|---|
| 934,614 | Huxley | Sept. 21, 1909 |
| 2,573,177 | Bohlen | Oct. 30, 1951 |
| 2,700,528 | Blackman | Jan. 25, 1955 |

FOREIGN PATENTS

| | | |
|---|---|---|
| 1,922 | Great Britain | Aug. 22, 1859 |
| 692,085 | Great Britain | May 27, 1953 |
| 883,374 | Germany | July 16, 1953 |